April 2, 1929. C. F. KETTERING ET AL 1,707,732
FRAME CONSTRUCTION FOR AUTOMOBILE CHASSIS
Filed Jan. 24, 1927 3 Sheets-Sheet 1

Inventors
Charles F. Kettering
& Charles R. Short
By Blackmore, Spencer & Hulí
Attorneys

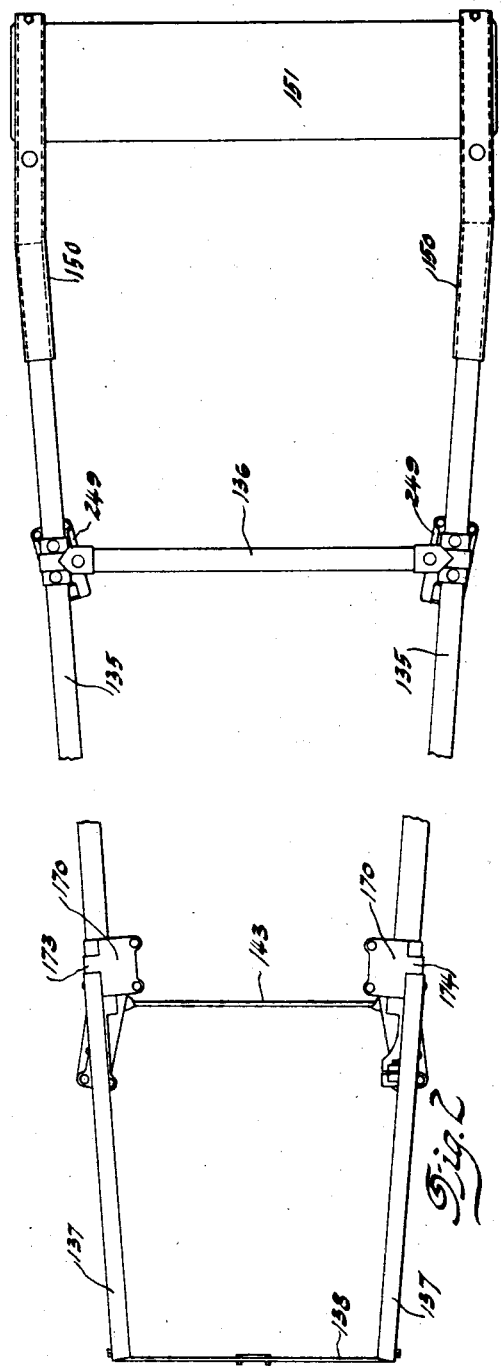
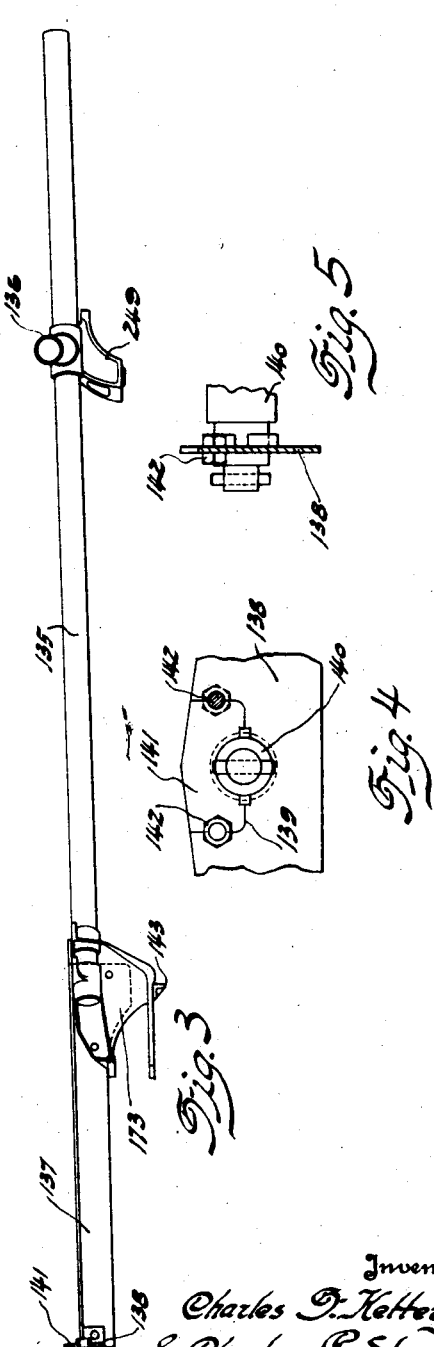

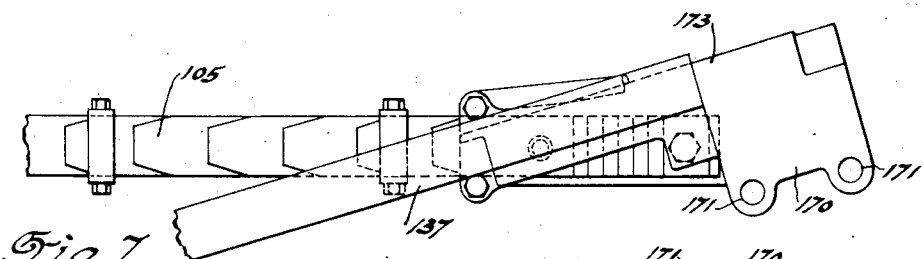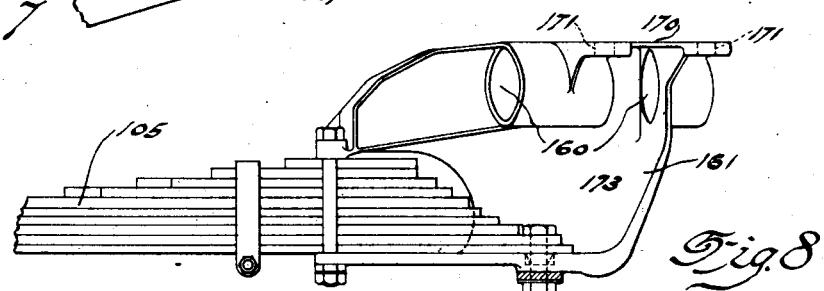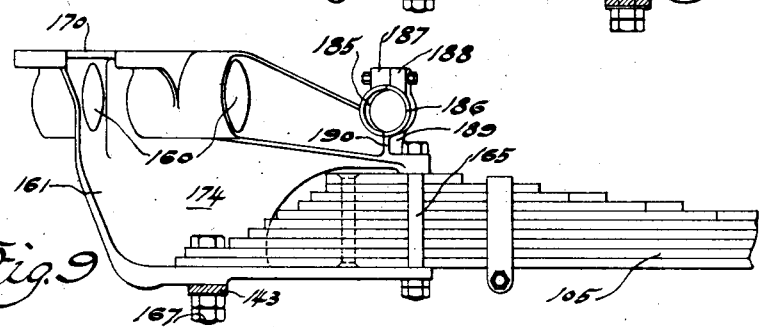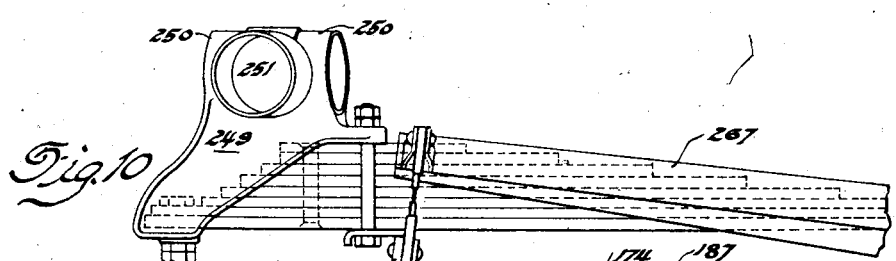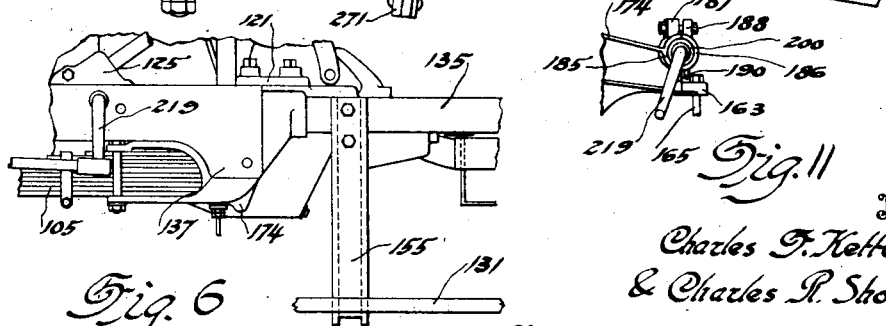

Patented Apr. 2, 1929.

1,707,732

UNITED STATES PATENT OFFICE.

CHARLES F. KETTERING, OF DAYTON, OHIO, AND CHARLES R. SHORT, OF DETROIT, MICHIGAN, ASSIGNORS TO GENERAL MOTORS RESEARCH CORPORATION, OF DAYTON, OHIO, A CORPORATION OF DELAWARE.

FRAME CONSTRUCTION FOR AUTOMOBILE CHASSIS.

Original application filed April 15, 1922, Serial No. 553,075. Divided and this application filed January 24, 1927. Serial No. 163,217.

Our invention relates to motor driven vehicles and particularly to the running gear or chassis of such vehicles. Our invention is particularly directed toward the part of the chassis commonly referred to as the frame thereof, or as the vehicle frame; and the object thereof is to provide various improvements in and relating to the frame and whereby a stronger and better frame is provided than heretofore.

Our invention in addition to various features of frame construction per se includes certain features of frame structure whereby the engine which drives the vehicle is the better supported from the frame than heretofore, certain other features associated with the support of the steering mechanism or device from and by the frame, and certain other constructions provided for supporting the fuel tank of the vehicle; as well also as other features involved in and relating to the frames of motor driven vehicles and whereby an improved frame construction is provided.

This present application is a division, required by the Commissioner of Patents, of an earlier case filed by us upon April 15, 1922, for improvements in motor vehicles, Serial Number 553,075.

Further objects of the invention will be apparent from the following specification wherein our invention is described, from the accompanying drawings wherein the preferred embodiment thereof is illustrated, and from the concluding claims wherein the distinguishing features wherein our invention consists are particularly pointed out.

Referring now to the drawings:

Figure 2 is a view showing the frame alone in plan, the central parts of the side bars thereof being omitted to shorten the view.

Figure 3 is a similar view showing a side view of the further side member of the frame as seen from a position inside the frame.

Figure 4 is a detail showing the manner in which the front end of the engine which drives the vehicle is supported from a front cross-bar of the frame.

Figure 5 is another view showing the manner in which the front end of the engine is supported.

Figure 6 is a view showing certain features of a front spring supporting bracket of the frame and of the steering mechanism of the vehicle, as well also as certain peculiarities in the frame and in the manner in which it is constructed.

Figures 7 and 8 are plan and side views showing a spring supporting bracket at the front end and on the right hand side of the chassis frame.

Figure 9 is a side view showing a similar bracket at the front and left hand side of the frame.

Figure 10 is a side view showing one of two similar spring supporting brackets made use of at the rear end of the frame.

Figure 11 is a view showing certain elements and features shown in Figure 9 upon a larger scale, and more in detail.

Figure 1:
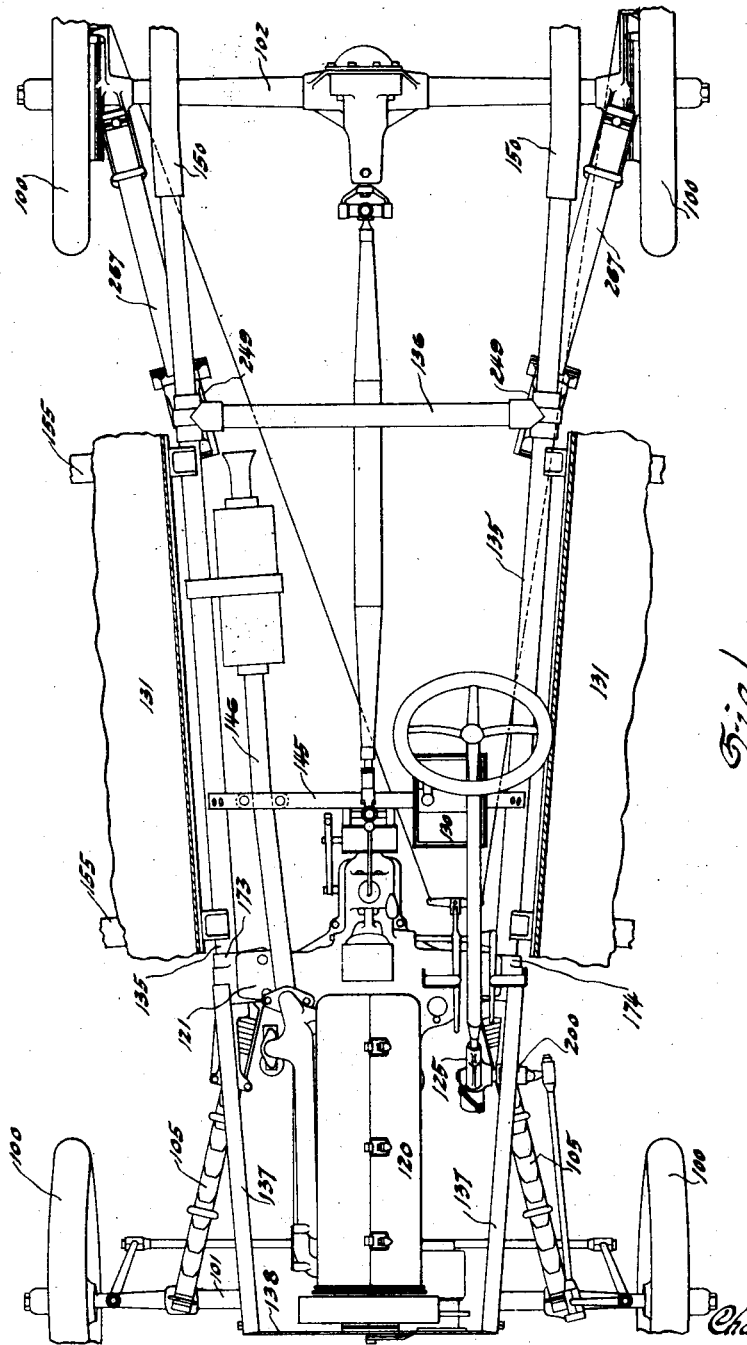
Figure 1 is a view showing a motor vehicle chassis in plan, the same having the improved frame construction and other features wherein our invention consists.

Referring particularly to Figure 1 wherein a complete chassis having the features wherein our invention consists is illustrated, the wheels of the vehicle are designated by the reference numeral 100, and the front and rear axles by the numerals 101 and 102; and the frame of the chassis is supported from the axles through four quarter-elliptic springs, the front ones of which are designated by the numeral 105 and the rear ones of which are arranged beneath torque arms 267 which are disclosed in detail and claimed in our application hereinbefore referred to, and of which this one is a division.

Supported from the frame of the chassis is the power plant 120 which drives the vehicle, and to which our application No. 553,938, filed April 17, 1922, relates, the steering gear 125, the battery 130, the steps or running boards 131 and other parts not herein involved; and the body of the vehicle not shown is supported from the chassis, and immediately by and upon the frame, as will be understood.

The frame per se of our invention is shown as comprising two longitudinally extending tubular side members or bars 135 which extend from a position above the rear axle 102 through correspondingly shaped portions 250 of T-shaped brackets 249, see Figure 10, which support the front ends of the rear springs; and into like shaped portions 160, see Figures 8 and 9, of the front spring brackets 173, 174 to which the rear ends of the front springs are fastened. These spring supporting brackets are disclosed in detail and claimed in the parent case hereinbefore referred to and of which this one is a division. The side members are made preferably from steel tubing of suitable diameter, and they are securely fastened in place in the tubular portions of the spring brackets, preferably by welding, to thereby provide a stiff frame and one well adapted to resist tortional or twisting stresses set up therein by irregularities in the roadway when the vehicle is in use. A third and similar cross frame member 136 extends into openings in side portions 251 of the rear brackets and serves to tie the rear ends of the side members 135 together, as will be understood.

The front ends of the tubular members 135, as stated above, are rigidly secured to the front spring brackets 173, 174 by welding or otherwise, and the latter are provided with inwardly and laterally extending portions or seats 170 to which the crankcase of the engine may be securely bolted, to thereby provide a construction in which the crankcase serves the purpose of an additional cross member for the frame; which construction is shown most clearly in Figure 1 of the drawings.

By this arrangement of tubing and by the use of broad flat feet 121 integral with the crankcase of the engine, and bolts extending through the holes 171 in the portions 170, and in the feet, it will be seen that the frame in connection with and when the engine is in position therein, constitutes a relatively rigid platform support for the body of the vehicle. Furthermore, on account of the substantial freedom of the frame from twisting, the torsional stresses being resisted by the cross member 136 rigidly secured to the side members, and because the crank case rests upon broad supporting surfaces of the spring brackets and is bolted thereto, a much lighter body construction can be used than has heretofore been the case.

In order to provide a front extension of the frame for the purpose of supporting the front end of the engine, and in order to furnish means for supporting the hood or other structure whereby the engine is enclosed, sheet metal supporting arms 137 right angular in cross section are riveted or otherwise secured to the outer sides of the front spring brackets 173, 174 in such a manner as to extend forwardly and substantially in line with the tubular members 135, as best shown in Figure 1. The front ends of the members 137 are connected together by means of a cross member 138 which provides a support for the front end of the crank case of the engine.

This cross member 138 is shown in Figures 4 and 5 as comprising a vertically arranged plate which is notched at its middle portion, which feature is clearly shown in Figure 4. This notch is in the upper edge of the plate as indicated at 139, and is of such shape as to permit the extreme front end of the crank case 140 of the engine to rest in the lower portion thereof; and a metal filling piece 141 so shaped as to fit snugly in the notch 139 over the crankcase portion 140, which piece is securely fastened in place in the notch by means of bolts 142, to thereby hold the front end of the crankcase in place.

The frame also includes a cross tie member 143, which member is secured at its ends to the under portion of the front spring brackets 173, 174 in the manner indicated in Figures 2 and 8. This cross member serves to tie the frame together at this point when the engine has been removed, and adds additional strength and rigidity to the frame when the engine is in place.

The frame is also provided with a cross member 145 which furnishes means for supporting the muffler pipe 146, as well also for supporting the battery 130, as most clearly shown in Figure 1.

The rear ends of the tubular frame members 135 are provided with tubular extensions 150 secured over their ends, for the purpose of supporting the fuel tank of the vehicle. These extension members extend to a point to the rear of the rear axle 102, and are provided with suitable means for holding the fuel tank in place.

The tubular side member 135 also furnish supports for the running boards 131 through suitable brackets 155 secured to said members. As stated above, the front and rear pairs of spring brackets furnish not only means for attaching the ends of the springs, but also furnish points of attachment for the cross member 136, and for the supporting feet of the crankcase of the engine, which latter acts as a second cross member. Figures 7 and 8 illustrate the right hand front spring bracket 173, while Figure 9 illustrates the left hand front spring bracket 174. These two brackets are exactly the same except that they are made rights and lefts, and except for the fact that the spring bracket 174 is provided with means for supporting the steering gear 125. Although certain features of these brackets are referred to, their detailed construction is for the most part not herein described, as they are included in and form parts of the invention disclosed in the parent application of which this present application is a division.

The right hand front spring bracket 173 will be seen to comprise a casting provided with a tubular portion 160 made in two sections for the purpose of affording a more firm attachment for the front ends of the side members 135, which tubular portion is integral with a web portion 161 which extends downward to the lower end of the bracket. Said bracket is also provided at its upper end with a flat lateral and inwardly projecting pad 170 which furnishes a support for, and to which a supporting foot 121 of the crankcase of the engine may be secured, as indicated in Figures 1 and 2, the crankcase being secured to the projecting portion of the bracket by bolts extending through holes 171 provided in it and through corresponding holes in the crankcase.

The only substantial difference between the two front spring brackets lies in the fact that the left bracket, see Figures 9 and 11, is provided with means for supporting the steering gear 125. In this left hand bracket the upper part thereof has integral therewith one-half 185 of a tubular clamp member which forms a seat for a tubular portion or housing 200 extending sidewise from the steering gear housing, and through which portion the shaft which has the steering arm 219 at its outer end passes. The other half 186 of this clamping means has also a semi-cylindrical portion corresponding with the portion 185, and a boss 188 provided with a bolt hole whereby said last mentioned member may be attached through the boss 187 to the semi-cylindrical seat 185, as shown in Figures 9 and 11. The lower end of the portion 186 has a lug or projection 189 which is intended to fit into the space between the head of one of the bolts 165 which fastens the spring to the bracket and the front side of a web 190 of the spring bracket, as indicated in Figure 11; whereby and when the steering gear is in place it may be fastened by means of a single bolt extending through holes in the lugs 187, 188.

As above stated, the tubular side frame members 135 extend through tubular portions of the rear spring brackets 249, and the brackets are securely fastened to the frame members by welding or otherwise.

The rear spring brackets differ considerably from the front spring brackets but both are identical, except that they are made rights and lefts. One of said brackets is shown in Figure 10, from which it will be noted that the same is of substantially T form having a tubular portion 250 which receives a side frame member, and a side tubular portion 251 for receiving an end of the cross tube 136.

The side frame members extend through the tubular protions 250 and are welded in place therein, and the ends of the cross frame member 136 extend into and are likewise secured in place in the side outlets 251 of the brackets.

The rear spring supporting brackets are integral structures as will be appreciated, and are provided with dependent stirrups as illustrated in Figure 10; but the details of these brackets are not herein further described, because the brackets are included in and form a part of the invention to which the parent application of which this one is a division relates.

In the chassis above described the frame, made up as hereinbefore explained, is of increased rigidity because of the features of construction to which reference has been made, this rigidity being secured by the use of the tubular side members to which the brackets are rigidly fastened, together with the cross member 136 and the second cross member provided by the crankcase of the engine. By this construction the frame constitutes a substantially rectangular platform of great rigidity and having spring brackets at its four corners, and from which the springs extend to the axles of the vehicle; the front end of the engine being supported by arms extending from the front spring backets above referred to, as hereinbefore explained. Such a frame permits the use of a lighter body construction than has heretofore commonly been thought necessary, as there is little need of relying upon the body itself to take up torsional stresses due to unevenness in the roadway over which the vehicle is moving.

Having thus described our invention and explained the operation thereof, we claim and desire to secure by Letters Patent:

1. An improved frame construction for motor driven vehicles comprising two longitudinally extending side members spaced apart from one another; two rear spring supporting brackets fastened to the rear ends of said bars; a rear cross member extending between and the ends of which are fastened to said brackets; two front spring supporting brackets fastened to the front ends of said side members; engine supporting seats extending inwardly from said front spring brackets; two supporting arms separate from said side frame members and which arms extend forwardly from, and the rear ends of which are fastened to said front spring brackets; a cross member extending between and the ends of which are fastened to the front ends of said arms; and means carried by said cross member for supporting the front end of the engine which drives the vehicle.

2. An improved frame construction for motor driven vehicles comprising two longitudinally extending side members spaced apart from one another; two front spring supporting brackets fastened to the front ends of said side members; engine supporting seats extending inwardly from the upper sides of said brackets; a cross member extending between and the ends of which are fastened to said brackets at their lower or under sides; two supporting arms separate from said side frame members and which arms extend forwardly from, and the rear ends of which are fastened to the outer sides of said spring brackets; and a cross member extending between and supported by the front ends of said arms, and which cross member is adapted to support the front end of the engine which drives the vehicle.

3. In improved frame construction for motor driven vehicles, two side frame members having front spring supporting brackets at their front ends; two supporting arms separate from and the rear ends of which are fastened to said brackets; and a vertically arranged plate extending between and the ends of which are fastened to the front ends of said arms, and which plate is adapted to support the front end of the engine which drives the vehicle.

4. In improved frame construction for motor driven vehicles, a vertically arranged plate fastened to the front end of the frame, and which plate has a centrally arranged notch in its upper edge; a filling piece fitting within said notch; and means for holding said filling piece in place within said notch; said plate and filling piece being shaped to engage and support the front end of the engine which drives the vehicle.

5. In a frame construction for motor driven vehicles, a side frame member having a spring supporting bracket fixedly secured to its forward end; and means carried by said bracket for supporting the steering column and arm of the steering mechanism of the vehicle.

6. In a frame construction for motor driven vehicles, a side frame member having a spring supporting bracket fixedly secured to its forward end; an inwardly extending engine supporting seat integral with said bracket; and means upon said bracket for supporting the steering column and arm of the steering mechanism of the vehicle.

7. In frame construction for motor driven vehicles, a side frame member having a spring supporting bracket fixedly secured to its forward end, and which bracket is provided with a semi-cylindrical seat portion; a clamping member having a similar seat portion, the two seat portions together forming a cylindrical seat adapted to receive a tubular portion of the steering gear of the vehicle; and means for securing said clamping member to said bracket.

8. In frame construction for motor driven vehicles, a side frame member having a spring supporting bracket fixedly secured to its forward end; means carried by said bracket for supporting a tubular portion of the housing of the steering mechanism of the vehicle; and a supporting arm secured to said bracket and extending forwardly therefrom, and which arm has an opening arranged in line with and through which the tubular portion aforesaid extends.

In testimony whereof we have signed this application.

CHARLES F. KETTERING.
CHARLES R. SHORT.